United States Patent [19]

Liverani

[11] Patent Number: 5,738,001
[45] Date of Patent: Apr. 14, 1998

[54] COFFEE MACHINE

[75] Inventor: Furio Suggi Liverani, Trieste, Italy

[73] Assignee: Illycaffe's S.P.A., Italy

[21] Appl. No.: 735,115

[22] Filed: Oct. 22, 1996

[30] Foreign Application Priority Data

Oct. 31, 1995 [EP] European Pat. Off. ............ 95830462

[51] Int. Cl.$^6$ ........................ A47J 31/52; A47J 31/54
[52] U.S. Cl. ...................... 99/283; 99/281; 99/280
[58] Field of Search ........................ 99/280, 281, 282, 99/283, 289, 300, 307

[56] References Cited

U.S. PATENT DOCUMENTS 4,583,449   4/1986   Dangel et al. ........................ 99/279
5,014,611   5/1991   Illy et al. ........................ 99/280
5,440,972   8/1995   English ........................ 99/283 X

FOREIGN PATENT DOCUMENTS 8803163   7/1990   Netherlands.

*Primary Examiner*—Reginald L. Alexander
*Attorney, Agent, or Firm*—Keil & Weinkauf

[57] ABSTRACT

A control device processes simultaneously the signals received from a temperature sensor and from a water delivery counter means to control instant by instant the pump delivery and the electricity feeding of the machine heat exchanger so as to maintain at the reference temperature the water exiting the heat exchaner;

5 Claims, 2 Drawing Sheets

COFFEE MACHINE

The present invention concerns improvements to a coffee machine, more precisely to the coffee machine disclosed in the European Patent N° 0380947 granted to the applicant which is equivalent to U.S. Pat. No. 5,041,611.

PRIOR ART

The coffee machine according to said European Patent is provided with a water source, an electric pump to transfer the water to a coffee brewing chamber after passing through a heat exchanger that can instantly heat the water to the desired temperature considered the most suitable to provide a good coffee beverage from the coffee pad placed in the brewing chamber, a temperature that shall henceforth be defined as the reference temperature, while a water delivery counter means measures the quantity of water transferred towards said chamber instant by instant, a temperature sensor senses the temperature of the water in the heat exchanger and a control device receives the signals from said water delivery counter means and said temperature sensor and processes them according to a set algorithm in order to control the electric resistor of the heat exchanger in such a way that the temperature of said resistor increases with the increase in the quantity of water transferred and, hence, that this water is kept at a reference temperature. It is known that the quantity of water transferred into the coffee cup also depends on the resistance exerted by the coffee pad held in the brewing chamber and that this resistance varies during the brewing of the coffee owing to the fact that said resistance increases as the coffee pad swells as it absorbs water. Note that this machine may also have a programmed clock as a counting device, obviously as a part of the control device, that measures the time the pump operates in transferring water and the control device is programmed so as to process the signals received from the clock and the temperature sensor according to a given algorithm and control that, after a first period of set time in which the water temperature is kept at the reference value, this temperature is left to drop gradually, until the clock has reached the maximum time set and therefore avoid a prolonged percolation at high temperature that may bring taste noxious substances into the cup.

Note also that in said European Patent a certain reference temperature, termed "starting temperature", was allowed to drop as a function of the time counted by the clock or as a function of the volume of water counted by the water delivery counter.

Another document is known, NL-A-8 803 163 from Verheijen B. V., which discloses a coffee machine comprising:

a water reservoir, a water heating unit, a feeding pipe between said water reservoir and the inlet of the heating unit, a discharge duct close to the outlet of said heating unit and a control unit:

Additionally, the following parts are comprised in the machine: a pump located along the feeding pipe, operation means for setting the temperature, said means directing pulses to the control unit, and a temperature sensor close to the outlet side of the water heating unit. On operation, the pump and the heating unit are controlled from the control unit in such a way that, under a temperature increase sensed flora the temperature sensor higher than the temperature values as set from the control unit, the operation of the heating unit is temporarily stopped until the required temperature is reached, whilst under a temperature lowering below the set value, sensed from the temperature sensor, the pump is acted so that the water velocity along the discharge duct is reduced temporarily until the required temperature is reached again.

Moreover:

- the pump is activated and stopped and may be adjusted stepless or at steps and, under said temperature lowering, is adjusted to a lower capacity in order to reach again the required temperature.
- the water heating unit is activated and stopped
- the water heating is adjustable stepless or at steps and the heating unit, under said temperature increase over the required temperature, is lead to a lower capacity in order to reach again the required temperature.

But with the passing of time, after the first realizations of this machine, and while new series were manufactured, a drawback was encountered that arose from the heat exchanger that, owing to the limited space available in the machines body, and for reasons of cost, the industry supplied increasingly smaller and, hence, with an increasingly limited thermal inertia. So, although the heat exchanger still maintains the capacity to instantly heat the water it contains, at the same time the temperature of the water that flows through it to be transferred to the brewing chamber, under the pump's action, may excessively vary compared to the reference value and cause the brewing of coffee lacking in the aromatic substances desired.

PRESENT INVENTION

The improvements now made in the coffee machine avoid the above mentioned drawback and comprise:

- a control device that processes the signals received from the temperature sensor to control simultaneously instant by instant the pump delivery and the electricity feeding of the heat exchanger so as to maintain at the reference temperature the water exiting the heat exchanger;
- the control device that processes simultaneously the signals received from the temperature sensor and from a water delivery counter means to control instant by instant the pump delivery and the electricity feeding of the heat exchanger so as to maintain at the reference temperature the water exiting the heat exchanger;
- the water delivery counter means that measures instant by instant the difference between a pre-set water delivery value and the water delivery values that it is measuring and the control device processes the difference signals received from said counter means to cause the pump delivery transferring into the cup the desired volume of coffee drink.
- an additional temperature sensor located upstream from the heat exchanger and the control device that processes simultaneously the signals received from the temperature sensors in order to control instant by instant the pump delivery as a function of the difference between the water temperature detected by the sensor downstream and the water temperature detected by the sensor upstream from the heat exchanger;
- the control device that controls simultaneously instant by instant the pump delivery and the electric feeding of the heat exchanger as a function of said temperature difference.

It will be appreciated that the water delivery counter and the temperature sensors may be realized as virtual means operating through a proper software in a control device processing information stored therein.

The invention will now be described in greater detail with reference to the attached drawings that illustrate examples of embodiments.

THE DRAWINGS

FIG. 1 is a general drawing of a first embodiment, the

FIG. 2 is a pan drawing of a second embodiment, and the

DESCRIPTION OF THE PREFERRED EMBODIMENTS

Figure 1:
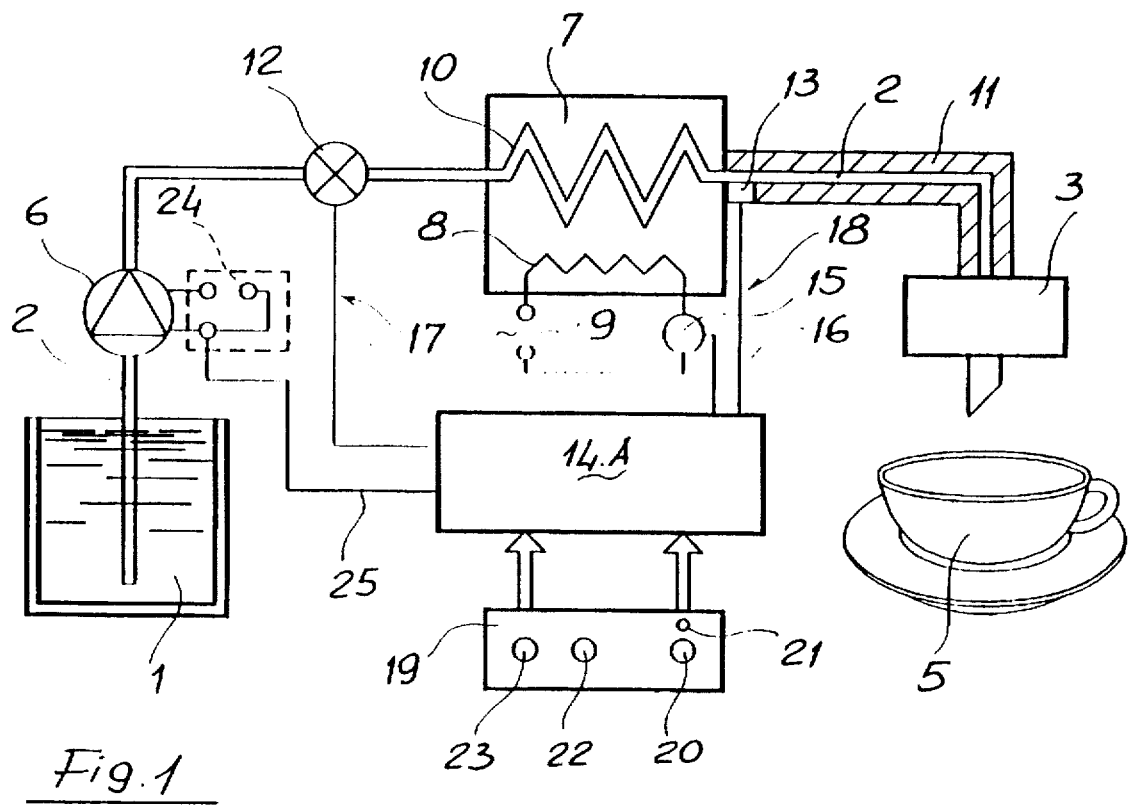

The FIG. 1 is the same as FIG. 1 of the above; mentioned European Patent, excepting the different location of the temperature sensor 13 and the introduction of a module 24 as specified below. The pans in common in both these FIGS. 1 are simply listed below with a brief mention of their meaning, whereas a detailed explanation may be found in the said European Patent. It will be clear that the programmed control device 14A is more complex than the device 14 comprised in the said European Patent.

The numbers show:

1 the water source, 2 the duct along which the water is transferred from the source 1 to the coffee brewing chamber, 3 the brewing chamber, 4 the spout in the brewing chamber 3 from which the brewed coffee drops into the cup, 5 the cup to gather the coffee dropped from the spout, 6 the electric vibrating pump to transfer the water, 7 the heat exchanger, 8 the electric resistor incorporated in the heat exchanger, 9 the source of electricity that feeds resistor 8, 10 the serpentine tract of the duct 2, within the heat exchanger.

11 the insulating material sleeve around a part of duct 2, 12 the water delivery counter means in the form of a transducer of the water flow in duct 2 that also serves to control that the volume transferred to the cup is the required amount (e.g. 40 cm$^3$ or 100 cm$^3$), 13 the water temperature sensor, 14A the programmed control device, 15 the component that opens and closes the electric resistor 8 circuit, 16 the conductor that connects component 15 to the control device 14A, 17 the conductors that connect the flow transducer to the control device 14, 18 the conductors that connect the temperature sensor to the control device 14, 19 the control panel associated to the control device 14A and comprising buttons 20, 22 and 23 to activate the, machine, request a standard coffee, alternatively request a diluted coffee, and a device 21 that signals the status of the temperature and any other machine function parameters.

The new features of the machine illustrated are:

the sensor 13 of the water temperature is located on the duct 2 at the exit of the heat exchanger 7, so as to detect the temperature of the water as it exits from the heat exchanger, instant by instant, the module 24 to intermittently feed electricity to the vibrating pump 6 is connected by means of conductor 25 to the programmed control device 14A that processes the signals received from the temperature sensor 13 according to a given algorithm, so that the vibrating pump 6 is activated after three seconds from the moment in which the user has activated the machine to request a standard coffee, is disactivated when the water temperature drops below the reference temperature and is activated again when the water has re-acquired the reference temperature (the said three seconds is the time necessary to be certain that the water within the heat exchanger has reached the reference temperature).

Alternatively, when a user activates the machine to provide a diluted coffee, the module 24 causes a reduction in the pump delivery after a unit functioning as a clock has measured the time necessary for the pump to transfer the suitable volume of water for a standard coffee and until the programmed time to transfer the volume of water suited to a diluted coffee, after which, of course, the pump stops.

Figure 2:
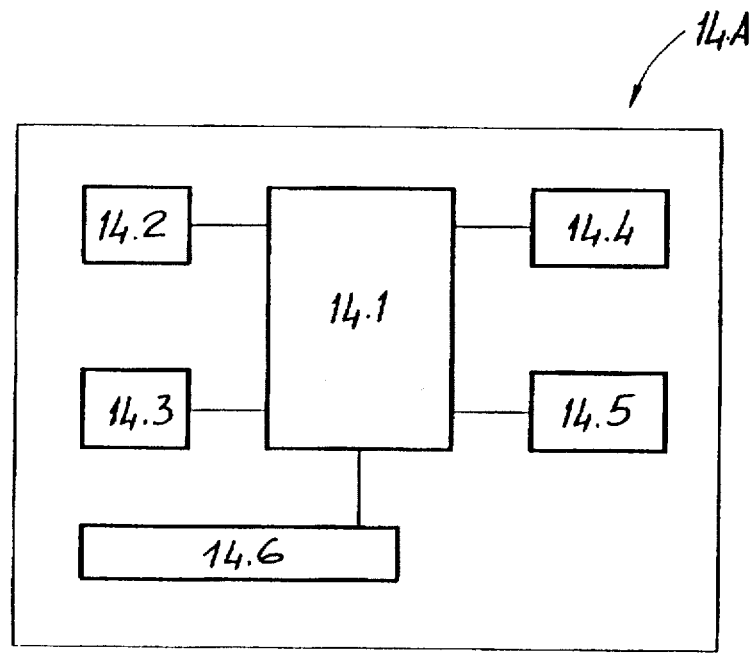

FIG. 2 shows the programmed control device 14A as a control system comprising various control units, from 14.1 to 14.6, that allow the realization of a series of machine functions.

The system 14A acquires signals from the delivery counter means 12 and from the temperature sensor 13 by means of auxiliary devices 14.2 and 14.3 and sends them to the programmed control unit 14.1 that, by using a suitable transferal function, determines the time for the feeding of electricity to devices 24 and 15 that respectively control the functioning of the vibrating pump 6 and the feeding of the electric resistor 8 of the heat exchanger 7 by means of units 14.4 and 14.5 in order to maintain the water exiling the heat exchanger al the reference temperature.

The system 14A may be realized also to acquire only the signals of the water delivery counter means 12 via unit 14.2 and send them to the programmed control unit 14.1 that, always using a suitable transferral function, determines the time and mode for the feeding of electricity to device 24 that controls the vibrating pump 6 function in such a way as to maintain the water exiting the heat exchanger at the reference temperature.

The interface unit 14.6 allows a user to request a coffee drink and, possibly, to control the functions of the machine.

The control system 14A allows various function modes for the machine. Of these modes at least 4 depend on the detection of the coffee machine function parameters (such as the flow of water in duct 2 controlled by means of the water delivery counter 12 and the water temperature measured at the exit of the heat exchanger and that may oscillate around the reference temperature as controlled by means of sensor 13).

For example, in order to realize 4 different machines, each according to one of the 4 modes considered among the most interesting for users, unit 14.1 can be programmed so as to respectively provide:

i) an input for the water reference temperature in order to achieve control over the electric resistor of the heat exchanger, in compliance with the state of the art; this input is generally provided for, once and for all, by the manufacturer; according to prior art;

ii) an input of the quantity and delivery of water by the pump, that is the quantity of beverage desired, in order to achieve control of the electric resistor of the heat exchange as a function of said quantity, in compliance with EP 0380947;

iii) an input of the water temperature as detected by the temperature sensor in order to achieve control of the pump delivery according to prior art;

iv) an input of the quantity and delivery of water to be transferred into the brewing chamber, that is of the volume of beverage desired by the user (e.g. a normal coffee or a diluted coffee) and an input of the water temperature detected by the temperature sensor again to obtain a consistent control, instant by instant, of the pump delivery and the resistor of the heat exchanger, in compliance with the present invention.

Mode iii) is easily realized; a conventional control system of the PID (Proportional Integrative Derivative) type can be adopted or a proportional band control can be implemented, in which the pump delivery varies proportionally as a function of the water temperature exiting the heat exchanger according to the function Q=k'+k"(Tr−T) where:

k' and k" are two constants of the heat exchanger that depend on the characteristics of the pump delivery and of the thermal reactivity chosen for the system (exchanger and other parts of the machine), Tr is the reference temperature, T is the temperature measured at the heat exchanger exit.

In this case the heat exchanger must have its own control system and must be considered at a constant temperature between 100° C. and 120° C. This mode solves the problem of controlling the water temperature when using heat exchangers with very low thermal inertia.

Mode iv) may be realized with well known not classic control methods, such as, for example, neural networks, "fuzzy logic" controls or the multigoal control systems. The detailed explanation of the, realization of these modes does not appear to fail within the needs of the present patent document, and a person with normal knowledge of said control methods can solve the problem within the present context. We can recall that a fuzzy logic control can be realized by using, instead of an equation, a device normally traded, for example a unit by American Neuralogix NLX 230, based on a number of rules of the following kind:

if the temperature of the water exiting the heat exchanger drops, then cut down the pump delivery;

if said temperature drops and the pump delivery is at its minimum level, then increase the temperature of the heat exchanger;

etc.

As we have previously seen, the pumping system (6, 24) may be modulated; so it becomes possible to obtain a further degree of freedom by adjusting the pump rate to the resistance exerted by the pad of ground and compressed coffee. In fact, it is well known that the quantity of water delivered by the pump depends on the characteristics of the pressure delivery of the pump used and inter-acts with the resistance exerted by the pad of coffee; this resistance is determined by the granulometry of the coffee powder used, by the quantity of coffee and by the force exerted in compacting the coffee pad, in addition to the characteristics of the filter to contain the pad itself. Small variations to said parameters may impress significant changes to the preparation times and to the organo-lectic characteristics of the coffee beverage. To compensate for these small variations and hence obtain that the coffee machine produce a beverage as constant as possible in its good quality it is necessary to stabilize the water delivery during the entire time of the brewing of the coffee; this is possible by controlling the pump as a function of the difference between a value of pump delivery pre-set by the user and the signal arriving from the delivery counter means. Said pre-set delivery value is a value chosen among more values foreseen relatively to the types of beverage offered by the machine (e.g. a diluted or concentrated coffee). This function mode can be associated to the temperature control by unit 14.1.

Figure 3:
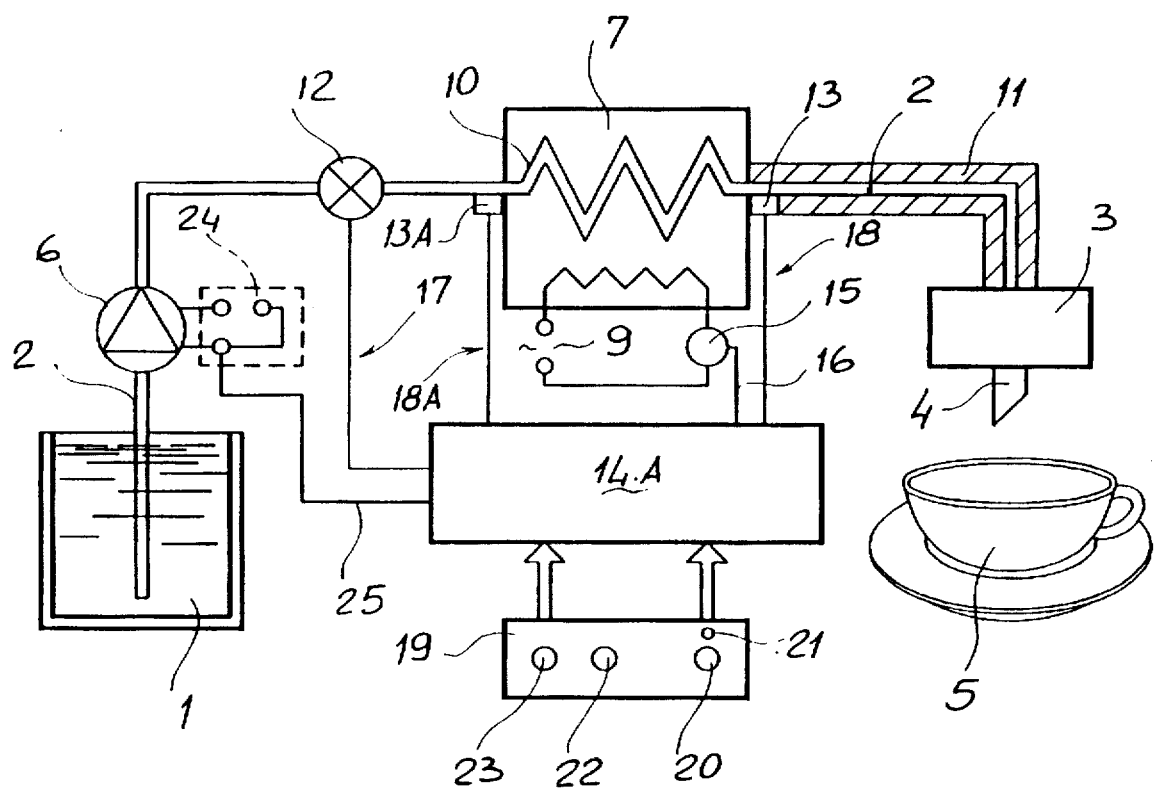
FIG. 3 is a general drawing of a second embodiment.

FIG. 3 is no more than the diagram shown in FIG. 1 with the addition of a temperature sensor 13A that touches duct 2, and connected to unit 14A by means of wire 18A, upstream and close to heat exchanger 7. The control system 14A will therefore be fitted with a unit able to control the function of the pump as a function of the difference between the water temperature detected at the exit of the heat exchanger and the water temperature detected at the entry to the heat exchanger.

What is claimed is:

1. In a coffee machine comprising a source of water (1) and an electric pump (6) to transfer water to a brewing chamber (3) after passing through a heat exchanger (7) where it is heated by an electric resistor (8) able to instantly bring the water to the desired reference temperature (Tr), at least one water delivery counter means (12) that instant by instant measures the quantity of water transferred towards said chamber, a temperature sensor (13) that instant by instant detects the temperature reached by the water and a single control device (14A) that receives signals from said temperature sensor (13) set in contact with the water duct (2) downstream and close to the heat exchanger (7), the control device (14 A) being programmed to control instant by instant the pump delivery (6,24) as a function of the signals received from the temperature sensor (13) and separately to control the electric feeding (8.15) of the heat exchanger (7) as a function of the signals received from the water delivery counter (12), the improvement wherein the control device (14 A) processes the signals received from the temperature sensor (13) to control simultaneously instant by instant the pump delivery (6,24) and the electricity feeding (8,15) of the heat exchanger (7) so as to maintain at the reference temperature (Tr) the water exiting the heat exchanger (7).

2. A coffee machine according to claim 1 wherein the control device (14A) processes simultaneously the signals received from the temperature sensor (13) and from the water delivery counter means (12) to control instant by instant the pump delivery (6.24) and the electricity feeding (8.15) of the heat exchanger (7) so as to maintain at the reference temperature (Tr) the water exiting the heat exchanger (7).

3. A coffee machine according to claim 1 wherein the water delivery counter means (12) measures instant by instant the difference between a pre-set water delivery value and the water delivery values that it is measuring and the control device (14A) processes the difference signals received from said counter means (12) to cause the pump delivery (6,24) transferring into tile cup tile desired volume of coffee drink.

4. A coffee machine according to claim 1 wherein an additional temperature sensor (13A) is located upstream from the heat exchanger and the control device (14A) processes simultaneously the signals received from the temperature sensors (13, 13A) in order to control instant by instant the pump delivery (6, 24) as a function of the difference between the water temperature detected by the sensor downstream (13) and the water temperature detected by the sensor upstream (13A) from the heat exchanger (7).

5. A coffee machine according to claim 4 wherein the control device (14A) controls simultaneously instant by instant the pump delivery (6.24) and the electric feeding (8,15) of the heat exchanger (7) as a function of said temperature difference.

* * * * *